United States Patent
Boeckstiegel et al.

(10) Patent No.: US 8,278,575 B2
(45) Date of Patent: Oct. 2, 2012

(54) TRIGGERING DEVICE FOR A HORN SYSTEM OF A MOTOR VEHICLE

(75) Inventors: Andreas Boeckstiegel, Oerlinghausen (DE); Andreas Hans, Niedernberg (DE); Bernhard Kempf, Kleinwallstadt (DE)

(73) Assignees: paragon AG, Delbrueck (DE); Takata-Petri AG, Aschaffenburg (DE)

( * ) Notice: Subject to any disclaimer, the term of this patent is extended or adjusted under 35 U.S.C. 154(b) by 295 days.

(21) Appl. No.: 12/740,048

(22) PCT Filed: Jan. 13, 2009

(86) PCT No.: PCT/EP2009/000132
§ 371 (c)(1),
(2), (4) Date: Jul. 19, 2010

(87) PCT Pub. No.: WO2009/090031
PCT Pub. Date: Jul. 23, 2009

(65) Prior Publication Data
US 2010/0276264 A1 Nov. 4, 2010

(30) Foreign Application Priority Data
Jan. 17, 2008 (DE) .......................... 10 2008 004 984

(51) Int. Cl.
*H01H 9/00* (2006.01)
(52) U.S. Cl. .................. 200/61.54; 200/1 B; 200/61.55; 200/61.56
(58) Field of Classification Search .... 200/61.54–61.56, 200/1 B, 51 LM, 512, 334; 280/731, 771, 280/728.2
See application file for complete search history.

(56) References Cited

U.S. PATENT DOCUMENTS

| | | | |
|---|---|---|---|
| 5,423,569 A * | 6/1995 | Reighard et al. | 280/731 |
| 5,965,952 A | 10/1999 | Podoloff | |
| 6,079,734 A * | 6/2000 | Porter | 280/728.3 |
| 6,135,494 A | 10/2000 | Lotito | |
| 6,918,610 B2 * | 7/2005 | Song et al. | 280/728.2 |
| 7,052,035 B2 * | 5/2006 | Kreuzer | 280/728.2 |
| 7,057,521 B1 * | 6/2006 | Beuk et al. | 340/11.1 |
| 7,060,924 B1 * | 6/2006 | Beene et al. | 200/512 |
| RE39,314 E * | 10/2006 | Nemoto | 280/731 |

(Continued)

FOREIGN PATENT DOCUMENTS

DE 4016047 A 11/1991
(Continued)

*Primary Examiner* — Michael Friedhofer
(74) *Attorney, Agent, or Firm* — Andrew Wilford

(57) ABSTRACT

A triggering device for a horn system of a motor vehicle is integrated in a steering wheel (2) of the motor vehicle. In order to prevent a relative movement of components associated with the steering wheel in relation to each other, but still enable a secure and reliable actuation of the triggering device of the horn system while at the same time allowing an optically compact and appealing design of the steering wheel (2), the invention proposes for the triggering device to comprise a first triggering unit (7), with which a parameter inherent in intended activation of the horn is detected. When such a parameter is detected, a first triggering signal can be emitted. The invention comprises a second triggering unit (11), with which a further parameter inherent in an intended activation of the horn is detected and a second triggering signal can be emitted. By means of the triggering device (7, 11), the horn system of the motor vehicle can be put into operation when the first triggering signal is emitted by the first triggering unit (7) and the second triggering signal is emitted by the second triggering unit (11).

12 Claims, 2 Drawing Sheets

U.S. PATENT DOCUMENTS

Figure 1:
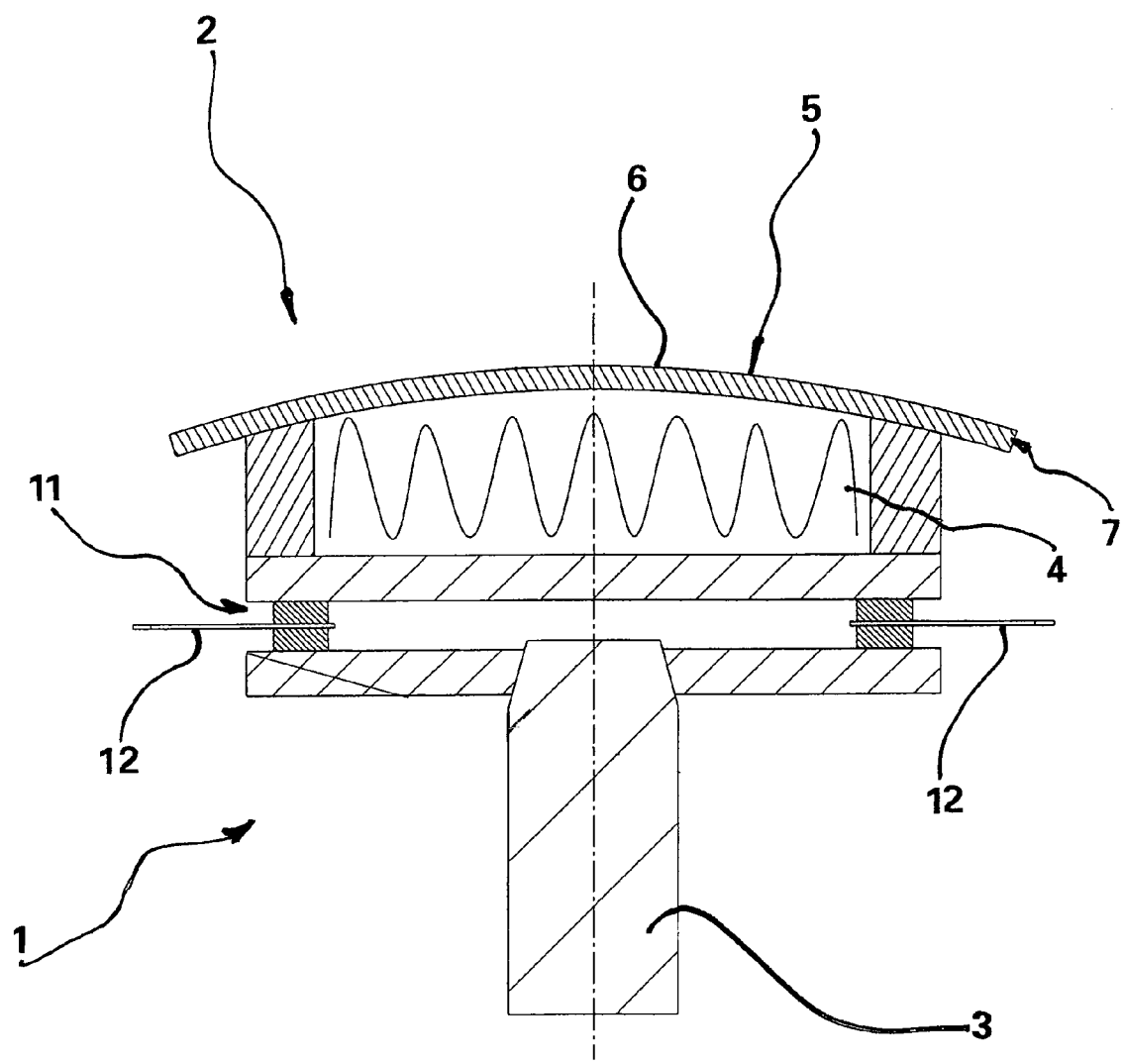

| | | | |
|---|---|---|---|
| 7,808,486 B2 * | 10/2010 | Griffin | 345/168 |
| 7,829,813 B2 * | 11/2010 | Murase et al. | 200/600 |
| 8,003,902 B1 * | 8/2011 | Cannella | 200/61.54 |
| 8,169,305 B2 * | 5/2012 | Matsumoto et al. | 340/384.1 |

FOREIGN PATENT DOCUMENTS

| | | |
|---|---|---|
| FR | 2863564 A | 6/2005 |
| JP | 05258639 A * | 10/1993 |
| JP | 2009298380 A * | 12/2009 |

* cited by examiner

TRIGGERING DEVICE FOR A HORN SYSTEM OF A MOTOR VEHICLE

CROSS REFERENCE TO RELATED APPLICATIONS

This application is the US national phase of PCT application PCT/EP2009/000132, filed 13 Jan. 2009, published 23 Jul. 2009 as WO2009/090031, and claiming the priority of German patent application 102008004984.0 itself filed 17 Jan. 2008, whose entire disclosures are herewith incorporated by reference.

The invention relates to an actuator for a motor-vehicle horn, which actuator is integrated into or onto a steering wheel of the motor vehicle.

In known actuators of this type, an actuating part is displaced a certain distance, thereby triggering the honking action. As a result, the capability must be provided in or on the steering wheel to enable a corresponding actuating part to shift along the triggering path. This adversely affects the design of steering wheel, such that under certain circumstances the construction of slits, gaps, or the like is required that make it difficult to seal the steering-wheel surface.

Based on the above-described prior art, the object of the invention is to create an actuator for a motor-vehicle horn that allows the designers of steering wheels greater freedom to ensure the operational reliability of the horn system at least to a degree equal to currently known actuators but with the possibility of a compact steering wheel design, and that furthermore allows for a gap-free and slit-free, fluid-tight design of the steering wheel surface.

This object is achieved according to the invention in that the actuator includes a first trip element for detecting a parameter accompanying an intended honking action and generating a first triggering signal, and a second trip element for detecting a second parameter accompanying an intended honking action is able to be detected and generating a second triggering signal, and that the horn system is able to be actuated by the actuator whenever both the first triggering signal is outputted by the first trip element and the second triggering signal is outputted by the second trip element. According to the invention, an actuator is created in which a honking action is triggered only when both parameters accompanying a honking action are present.

This approach allows the actuator to be constructed for example without a component that is movable relative to the steering wheel or to other components of the steering wheel.

If the first trip element in the actuator is a touch panel capable of detecting contact of a hand on a steering wheel surface and the first triggering signal can be outputted in response to detecting the contact of a hand on the steering wheel surface, a response is able to be prevented in every case where a mechanical load on the steering system will trigger a honking action, which can occur, for example when there are potholes, etc., during a collision or the like, since the triggering signal that indicates the presence of the hand on the touch panel is not present. The first triggering signal needed to actuate the horn system is outputted only when the hand is on the touch panel or in its immediate proximity.

If furthermore the second trip element is constructed as a pressure sensor mounted in the steering wheel of the motor vehicle serving to output the second triggering signal, this approach ensures that the presence of the hand near the touch panel by itself is not sufficient to actuate the horn system. A tangible pressure must also instead be exerted on the pressure sensor in order for it to output the second triggering signal. The mere act of passing the hand or sliding the hand across the steering wheel surface, even if the hand moves into contact or into the immediate proximity of the touch panel, does not by itself result in the actuation of the horn system since the above-described motion of the hand does not result in an application of pressure on the pressure sensor to make it output the second triggering signal. This triggering signal is outputted only when pressure is exerted by the hand on the steering wheel surface.

If a mechanical load or application of pressure on the pressure sensor is exerted in some other way, this does not result in the actuation of the horn system since the second required condition, that is, the outputting of the first triggering signal, is absent as long as the hand is not on the steering wheel surface, i.e. on the touch panel.

The cover of the steering wheel can be designed without in any way having to take into account the actuator of the horn system. The touch panel of the actuator is advantageously underneath the cover of the steering wheel.

If the touch panel is constructed as a sensor-controlled, functional touch panel and includes a dielectric plate as well as an electrode underneath it, the first triggering signal can be generated as soon as the hand or parts of the hand are located at a distance of 5 mm from the surface of the touch panel. As has been already mentioned several times, the horn system is not, or not yet, actuated in this case since no pressure has as yet been applied to the pressure sensor.

In an advantageous further embodiment of the invention, the pressure sensor includes multiple pressure sensors, so a statically determinate system for those components between which the pressure sensors are disposed is able to be achieved in particular when three pressure sensors are provided.

Figure 2:
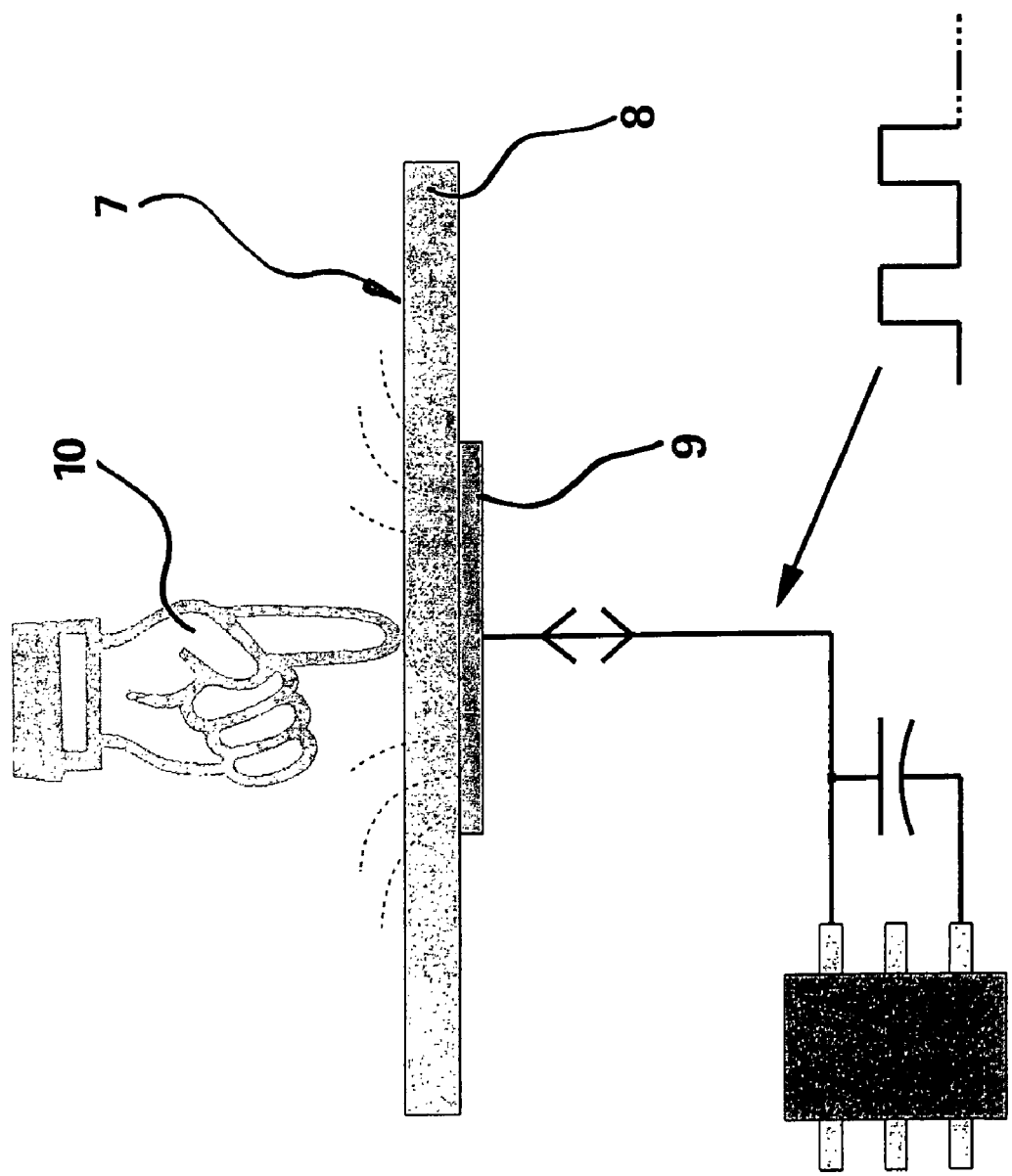

The following describes the invention in more detail based on one embodiment with reference to the drawing. In the drawing:

FIG. 1 is a schematic diagram of an embodiment of an actuator according to the invention that is integrated into a steering wheel, here for a horn system of a motor vehicle; and FIG. 2 is a schematic diagram of an embodiment of a touch panel of the actuator according to the invention shown in FIG. 1.

A steering-wheel assembly 1 shown schematically in FIG. 1 and part of an unillustrated motor vehicle is equipped as explained below with an embodiment of an actuator according to the invention for a horn system of the motor vehicle. A steering wheel 2 of the steering-wheel assembly 1 rests in the conventional manner on a steering column 3 of the steering-wheel assembly 1.

Aside from the above-mentioned actuator according to the invention for the horn system, an air bag 4 is integrated in the conventional manner into the steering wheel 2.

A steering-wheel outer face 5 is formed of the outside of a cover 6 made, for example, of leather. A sensor-controlling touch panel 7 is provided under the cover 6 and forms a trip element of the actuator that includes two trip elements in this embodiment.

In terms of the function of the touch panel 7, reference is made to FIG. 2 that shows that the touch panel 7 includes a dielectric plate 8 and an electrode 9. A field developed by the electrode within and above this plate 8 is modified or disturbed when a hand 10 approaches it. A first triggering signal is outputted when such a disturbance is present, as indicated in FIG. 2.

In addition, a pressure sensor 11 is integrated into the steering wheel 2, preferably three pressure sensors 12 of which two are shown in FIG. 1. Pressure exerted for example by a hand on the steering wheel surface 5 is detected by the sensors 12. As a result, a second triggering signal is generated.

As soon as both the first triggering signal of the touch panel 7 and the second triggering signal of the pressure sensor 11 are outputted, the unillustrated horn system of the motor vehicle is actuated by the above-described actuator. If only the first triggering signal of the touch panel 7 is present or if only the second triggering signal of pressure sensor 11 is present, the horn system of the motor vehicle is not actuated. Due to the above-described actuator for the horn system, the steering wheel 2 can be designed with no gaps or the like on the steering wheel surface. The steering wheel surface can be fluid-tight.

The invention claimed is:

1. An actuator for a motor-vehicle horn, the device being integrated into or on a steering wheel of the motor vehicle wherein the actuator includes at least a first trip element for detecting a parameter accompanying an intended honking action and generating a first triggering signal, and a second trip element for detecting a second parameter accompanying an intended honking action is able to be detected and generating a second triggering signal, and that the horn system is able to be actuated by the actuator whenever both the first triggering signal is outputted by the first trip element and the second triggering signal is outputted by the second trip element.

2. The actuator according to claim 1, wherein the first trip element is a touch panel able to detect contact of a hand on the steering wheel surface and output the first triggering signal in response to the contact of the hand on the steering wheel surface.

3. The actuator according to claims 2, the touch panel is disposed immediately underneath a cover of the steering wheel.

4. The actuator according to claim 2, wherein the touch panel is constructed as a sensor-controlled functional touch panel and includes a dielectric plate and an electrode thereunder.

5. The actuator according to claims 1 wherein the second trip element is a pressure sensor mounted in the steering wheel of the motor vehicle for outputting the second triggering signal in response to the application of pressure to the steering wheel.

6. The actuator according to claim 5, wherein the pressure sensor includes at least three such pressure sensors.

7. In combination with a motor-vehicle horn and a motor-vehicle steering wheel, an actuator comprising:
   an actuating part adapted to be acted upon by a user for sounding the horn;
   a first sensor associated with the actuating element for detecting a first parameter accompanying an intended honking action and for generating a first triggering signal in response thereto;
   a second sensor associated with the actuating part for detecting a second parameter accompanying an intended honking action is able to be detected and for generating a second triggering signal in response thereto; and
   circuit means connected to both of the sensors and to the horn for sounding the horn when both the first and the second triggering signals are generated.

8. The combination defined in claim 7 wherein the first sensor is a proximity detector responsive to the proximity of a human body part and the second element is a pressure sensor responsive to a physical pressure exerted on the actuating part.

9. The combination defined in claim 8 wherein the pressure sensor is a strain-gauge pressure sensor and supports the actuating part on the steering wheel so as not to be perceptibly movable relative to the steering wheel.

10. The combination defined in claim 8 wherein the proximity detector functions electrostatically.

11. The combination defined in claim 10 further comprising a nonconductive and nonshielding cover overlying the actuating part.

12. The combination defined in claim 11 wherein the cover is leather.

* * * * *